United States Patent [19]

Chambers et al.

[11] Patent Number: 5,555,218
[45] Date of Patent: Sep. 10, 1996

[54] COMPUTATION OF Q-DERIVED STATIC CORRECTIONS FROM SEISMIC DATA

[75] Inventors: Ronald E. Chambers, Houston; Subhashis Mallick, Missouri City, both of Tex.

[73] Assignee: Western Atlas International, Inc., Houston, Tex.

[21] Appl. No.: 394,471

[22] Filed: Feb. 27, 1995

[51] Int. Cl.$^6$ .................. G01V 1/30; G01V 1/32
[52] U.S. Cl. .................. 367/73; 367/47; 367/49; 364/421
[58] Field of Search .................. 367/47, 49, 73; 364/421

[56] References Cited

U.S. PATENT DOCUMENTS 4,729,101  3/1988  Hanson et al. .................. 364/421
5,479,376  12/1995  Gonzalez et al. .................. 367/47

OTHER PUBLICATIONS

Dai et al, 64th Annu. SEG Int. Mtg. Oct. 23, 1994, pp. 1418–1421, Pap No. SM92.

Primary Examiner—Nelson Moskowitz
Attorney, Agent, or Firm—William A. Knox

[57] ABSTRACT

The amplitude spectrum is generated within a selected time window of a seismic time scale recording. The rate of change, Q, of the natural logarithm of the signal amplitude is measured with respect to frequency. A Q-derived static time shift is computed and applied to the selected seismic time scale trace to correct the raw seismic times for dispersion-induced time distortion. Amplitude-correction and phase-correction filters are applied to the static-corrected trace to provide a new time scale trace corrected for velocity dispersion which is processed to provide a physical model of the subsurface of the earth.

3 Claims, 4 Drawing Sheets

5,555,218

COMPUTATION OF Q-DERIVED STATIC CORRECTIONS FROM SEISMIC DATA

BACKGROUND OF THE INVENTION

1. Field of the Invention

A method for deriving and using static corrections for the effects of dispersion due to anelasticity as applied to seismic signal data processing.

2. Discussion of Related Art

As is well known in the art of seismic exploration of the earth and shown in FIG. 1, an acoustic source, at or near the surface of the earth, repeatedly emits a wavefield from each of a plurality of seismic source locations, $S_i$, to insonify the subsurface earth layers, $L_i$. The wavefield is reflected from the respective earth layers. Returning to the surface, the reflected wavefields are detected by a plurality of suitable receivers, $R_j$, such as geophones or hydrophones which are deployed at preferred spatial intervals over an area of survey. The offset, $O_k$, that is, the separation between a source $S_i$ and some receiver $R_j$, typically ranges from a few hundred meters to 3000 or more meters. The separation between the individual receivers is termed the group interval which typically is about 100 meters. The separation between source locations is may be a multiple of the group interval. Often the multiple is unity.

The mechanical acoustic waves resulting from the reflected wavefields are detected by the receivers and converted to analog electrical signals which may be discretized and transmitted to a multichannel, central signal-recording device. Usually each receiver or receiver group is interconnected with a dedicated amplifier channel in the recording device via a signal transmission means which may be electrical, optical or ethereal. Each receiver may transmit its data through an individual transmission channel or a number of receivers may be time- or frequency-multiplexed into a single shared transmission means. As many as a thousand separate channels may be used to provide a single seismic record. Depending upon the total number of channels to be serviced, the effective listening time and the preferred data resolution, the analog data signals may be discretized at 0.5 to 4.0 millisecond (ms) intervals. The recorded data signals are formatted as a plurality of time-scale traces, one trace per channel, to provide recordings of two-way reflection travel time as a function of receiver offset.

Many of the wavefield trajectories between the various source locations and the respective receivers are redundant thereby to provide manifold common coverage groupings or gathers. Selected gathers having a desired multiplicity may include, by way of example but not by way of limitation, common depth point, common mid point, common receiver, common source, and common offset gathers.

The recorded seismic data signals are processed by suitable well-known means, usually by a programmed computer which may be coupled to a graphics processor, to convert the seismic signals into a different state such as a graphic 2- 3-dimensional scale model of the subsurface of the earth in a region of interest. Signal data processing may include (although not necessarily in the order listed below) electrical and/or digital filtering, trace stacking (summation) of data from a selected common coverage grouping, deconvolution, application of angularity and dip-related corrections (NMO and DMO), migration, correction for spherical spreading, time-depth conversion, corrections for instrumental artifacts and truncation transients, seismic noise, induced atmospheric transients and surface-consistent static correction. Generally in exploratory seismic studies, the media traversed by the wavefield trajectories are assumed to be non-dispersive.

The term "static correction" refers to erratic travel-time delays due to abrupt variations in properties of the near-surface low-velocity layer through which the wavefield trajectory travels between the source(s) and the receivers. The travel-time variations may be due to changes in layer thickness or changes in layer velocity or both. No matter how sophisticated may be the data-processing routine, in the absence of accurately-applied static corrections, the seismic data presentation will border on the useless.

Static corrections to be applied to common coverage wavefield trajectories are assumed to be surface-consistent. That is, static corrections are separately attributable to the locations of a specific source or a specific receiver.

In days of yore, static corrections were measured manually from near surface refracted travel times such as taught by H. Salvatori et al. in U.S. Pat. No. 2,087,120, issued Jul. 13, 1937, for *A Method for Computing Weathering Corrections in Seismic Surveying* and assigned to a predecessor firm of the assignee of this invention. Alternatively static corrections were sometimes determined by inspection of key reflections from the seismic data recordings. As the seismic exploration production rate increased by several orders of magnitude, manual empirical measurements gave way to the computer where the relative static delays are determined such as by intertrace cross-correlation. One well-known commercial process is the MISER® (trademark of Western Geophysical Co.) residual static correction program and described in a paper entitled *Residual Static correction Analysis As A General Linear Inverse Problem*, published in Geophysics, v. 41, n. 5 1976, by Ralph A. Wiggins et al. In that method for determining surface-consistent static corrections, seismic velocities in the regosol were assumed to be non-dispersive, that is, independent of frequency.

In attempting to account for otherwise unexplained data misties following meticulous application of known processing methods, we have discovered that the regosol may be anelastic in places. Anelasticity results in velocity dispersion wherein acoustic propagation velocity varies with respect to frequency which, in turn causes waveform distortion. There is a need for a method for determining surface-consistent static correction in dispersive-media.

SUMMARY OF THE INVENTION

A seismic wavefield is launched from a plurality of spaced-apart source locations. Following each seismic wavefield launching, the wavefield is received, after reflection from subsurface earth layers, by a plurality of acoustic receivers that are offset from the source locations. The seismic wavefield received at each receiver is converted to discretized electrical signals which are recorded on a suitable storage medium formatted as a plurality of raw time scale traces. For a selected reflection travel time window centered at time, T, each time-scale trace is analyzed to provide the power spectrum thereof, from which is measured a value for Q, the rate of change of the natural logarithm of the signal amplitude with respect to signal frequency. A reference frequency is selected that lies near the upper end of the effective passband embraced by the seismic wavefield spectrum. A surface-consistent static time-drift, $\Delta T_{static}$, is calculated from $$\Delta T_{static} = (T/\pi Q) \ln (f_{ref}/f_{min})$$

where $f_{min}$ includes discrete frequency components within the effective frequency passband but less than the reference frequency. The static time-drift is applied to the raw time scale traces to correct for dispersive-induced time shift. Frequency-dependent amplitude and phase shift filters are applied to the time-shifted traces thereby to provide new seismic signals free from dispersive effects. The new traces are processed and displayed to create a physical model of a cross section of the earth.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
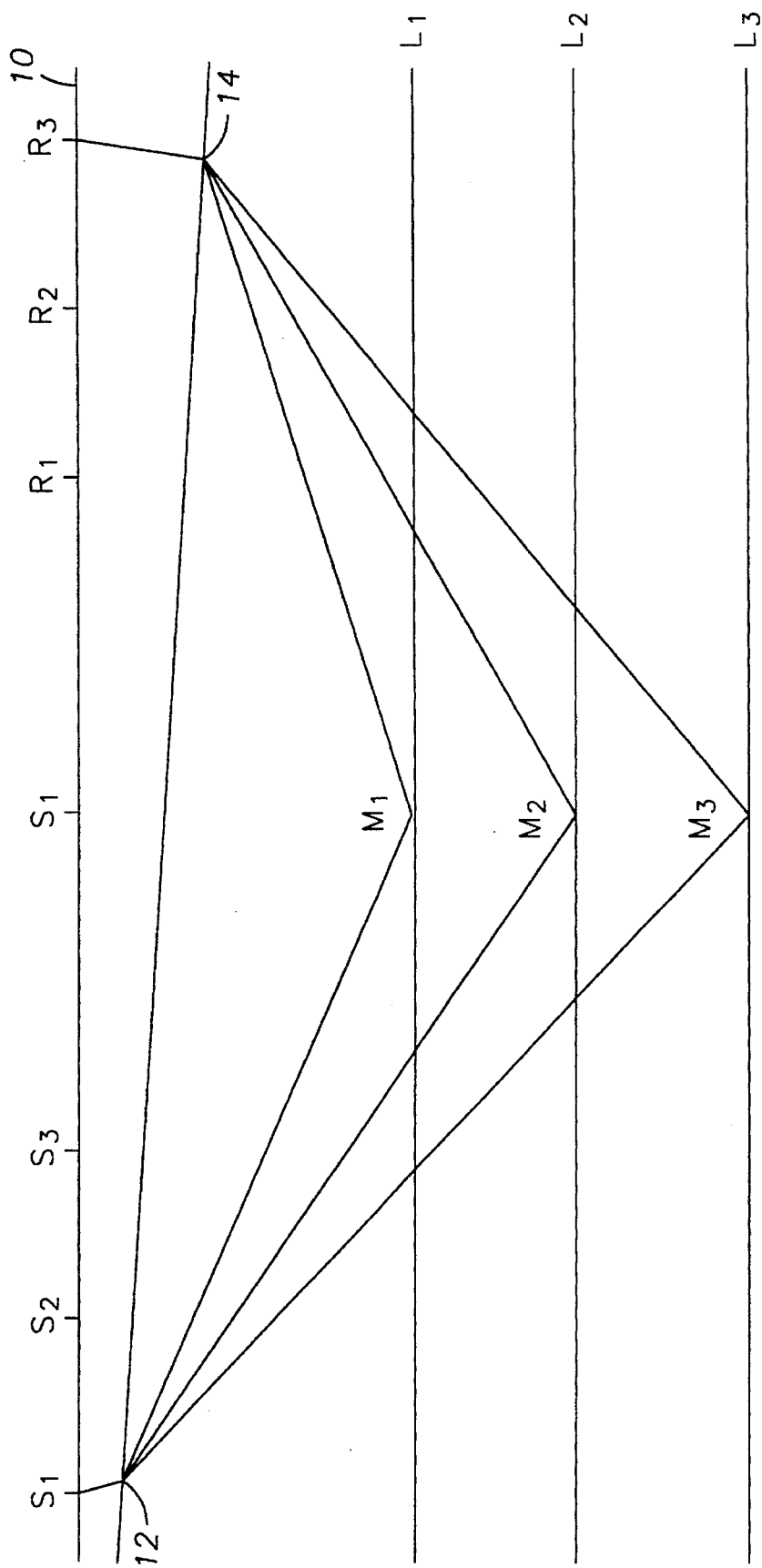
FIG. 1 is a graphical illustration of the art of seismic exploration illustrating the problem of static corrections.

In FIG. 1, a plurality of acoustic sources, S1–S3 are offset from a plurality of receivers R1–R3, all of which are located at or near the surface of the earth, shown as line 10. Beneath the surface 10, there exists a highly irregular low-velocity layer (LVL) the base of which is shown as W, below which lie the respective solid-earth formations such as L1–L3. Those layers for illustrative purposes are shown to have zero dip. By way of example but not by way of limitation, the acoustic propagation velocity above layer W may be 500 meters per second (m/s) or less while beneath layer W the velocity may be on the order of 3000 m/s or more.

An acoustic source launches a seismic wavefield from each one of a plurality of sources such as S1 to be received by a second plurality of receivers such as R1–R3 after reflection from one or more subsurface earth layers such as L1–L3. The travel time of the reflected wavefield along a given trajectory such as from S1 to R3 after reflection from a layer such as L1 at mid-point M1, is the sum of each travel-path segment S1–12, 12–M1, M1–14, 14–R3, divided by the velocity appropriate to that segment. The reflection travel times are reduced to zero offset by applying an angularity correction, called Normal Moveout (NMO).

After application of NMO, a residual time delay remains due to travel through the LVL. It is apparent from FIG. 1 that the residual LVL time delay, that is the static correction, between S1 and R3 is greater that what it would be between S1 and R1 because of the greater LVL thickness beneath R3. As discussed earlier, the static correction is due to irregular LVL thickness, irregular LVL velocity and anelastic dispersion. In general, a unique static correction is required for every source-receiver trajectory.

For practical purposes, formations beneath the base of the LVL do not exhibit significant dispersion over the seismic passband of 5–125 Hz, but severe dispersive effects may exist in the LVL. Dispersion results from anelastic properties of the regolith too create wavefield attenuation and phase distortion.

Anelastic attenuation is usually quantified by a dimensionless quantity, often termed the seismic quality factor or Q. The effect of such attenuation is that the seismic waves propagate with a complex frequency-dependent velocity where each plane wave with a given frequency f, propagates with a given phase velocity V(f). This frequency-dependent propagation results in the frequency dispersion. See for example, *Practical Aspects of Reflectivity Modeling*, by S. Mallick et al. and published in *Geophysics*, v. 52, n. 10, Oct. 1987, pp 1355–1364. The value of Q is related to the complex velocity V(f)

$$Q=2[Re(1/V)/Im(1/V)], \quad (1)$$

that is, Q is equal to twice the ratio between the real and imaginary parts of the slowness $1/V$.

Q is, in theory, frequency-dependent but as earlier explained, beneath the LVL, dispersion is not significant. But in the LVL, where large near-surface attenuation may be found, dispersion causes very large apparent time shifts. The attenuation-related time drift, $\Delta t_{static}$ can be computed from an estimated value for Q as will now be explained.

Consider a single seismic trace over a time window centered around a time, T. If A(f) is the amplitude spectrum of the windowed data trace, it has been shown that $$A(f)=A_o \exp(-\pi f T/Q) \quad (2)$$

where f is the frequency and $A_o$ is a constant. Taking the natural logarithm of both sides $$\ln A = \ln A_o - \pi f T/Q. \quad (3)$$

We now assume that Q is constant over the frequency range of interest. Equation (3) suggests that the least squares straight line of ln A as a function of f will estimate the value of Q. That method is known as the spectral ratio method of Q estimation.

Assume now that $V_{ref}$ is the phase velocity at time T for some reference frequency $f_{ref}$. Assume further that $V_{ref}-\Delta V$ is the phase velocity at time T for a different frequency $f_{ref}-\Delta f$. It can then be shown that $$[V_{ref}/(V_{ref}-\Delta V)]=1+(1/\pi Q)\ln[f_{ref}/(f_{ref}-\Delta f)]. \quad (4)$$

We have found that equation (4) can be used as a starting point for quantifying the static time drift as a function of frequency due to dispersion and for designing a filter for correcting phase and amplitude errors, as follows.

Assume that r is the total distance travelled by the wavefield. Also assume that T is the travel time at frequency $f_{ref}$ and $T+\Delta T$ is the travel time at frequency $f_{ref}-\Delta f$. Therefore $$T=r/V_{ref}, \quad (5)$$

and $$T+\Delta T=r/(V_{ref}-\Delta V). \quad (6)$$

Combining (5) and (6), $$\Delta T=\{[V_{ref}/(V_{ref}-\Delta V)]-1\}T. \quad (7)$$

From (4) and (7) we get $$\Delta T=T/\pi Q \ln[f_{ref}/(f_{ref}-\Delta f)]. \quad (8)$$

Equation (8) provides the time shift for every frequency, f, with respect to some reference frequency $f_{ref}$. To obtain the static time shift $\Delta T_{static}$ to be applied to the data, let $f_{min}$ and $f_{max}$ be the frequency minima and maxima respectively, within which frequency band, the data contain significant signal. From (8), we write $\Delta T_{static}$ as the time drift for frequency $f_{min}$ with respect to $f_{max}$ as $$\Delta T_{static} = T/\pi Q \ln f_{max}/f_{min}, \quad (9)$$

in which Q is obtained from a least-square fit to (3) between the effective upper and lower frequency limits (but not, necessarily, between the theoretical maxima and minima).

Figure 2:
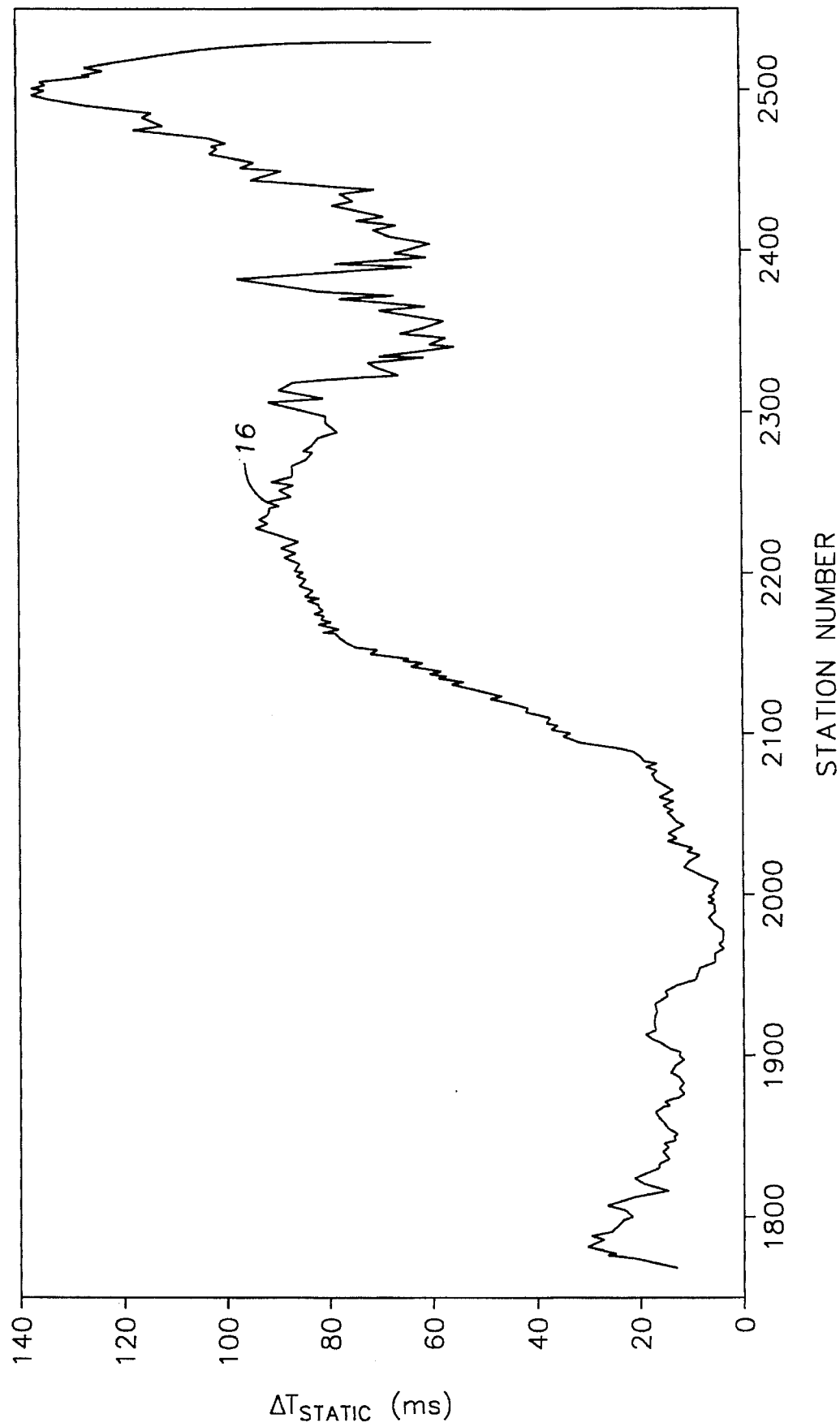
FIG. 2 is a graph of frequency-dependent static time drift as a function of station number.

FIG. 2 shows a tabulation of the static time drift, $\Delta T_{static}$, plotted as a curve 16 of static time drifts to be applied to the respective ones of seismic receiver stations 1800 through 2500. Between stations 1800 and 2100, a linear average of the time shift is 12 ms. Between about stations 2150 and 2450, the time shift jumps to about 76 ms. The drop-off at station 2500 is due to truncation error and is to be ignored. The tabulation was computed from equation (9) using a frequency pass band of 10–50 Hz with 50 Hz being selected as $f_{ref}$.

In generating FIG. 2, we have found that although it would appear from equation (9) that a different value for $\Delta T$ would be found for each discrete frequency $f_{min}$ the difference is very small. Thus, if the frequency pass band is not very wide, for practical purposes the ratio between the $f_{ref}$ and the average frequency within the pass band may be used to compute $\Delta T$.

Figure 3:
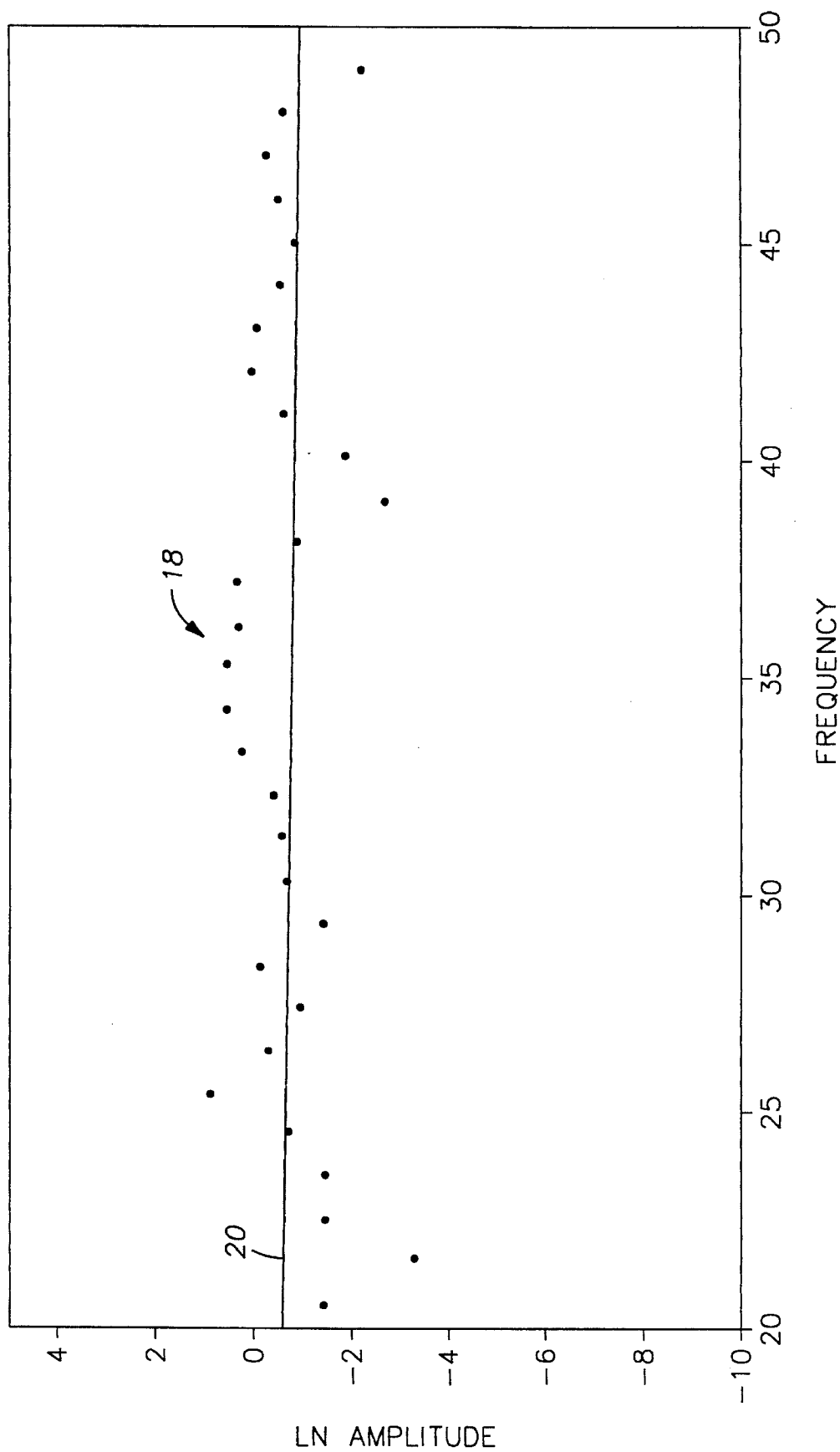
FIG. 3 is a graph of the logarithm of the reflection amplitude as function of frequency for a high-Q region.

Values of Q for use in solving equation (9) above were derived from equation (3) by measuring the slope of a curve relating (ln A) vs f for each frequency. FIG. 3 is a graph of (ln A) vs. f for station 2000. The amplitude values were, of course derived from the power spectrum of the data centered around a time window that was selected by reason of its high content of reliable seismic data. The slope 20 of the curve 18 was determined by least squares to be virtually zero, characterizing a region of high Q around station 2000.

Figure 4:
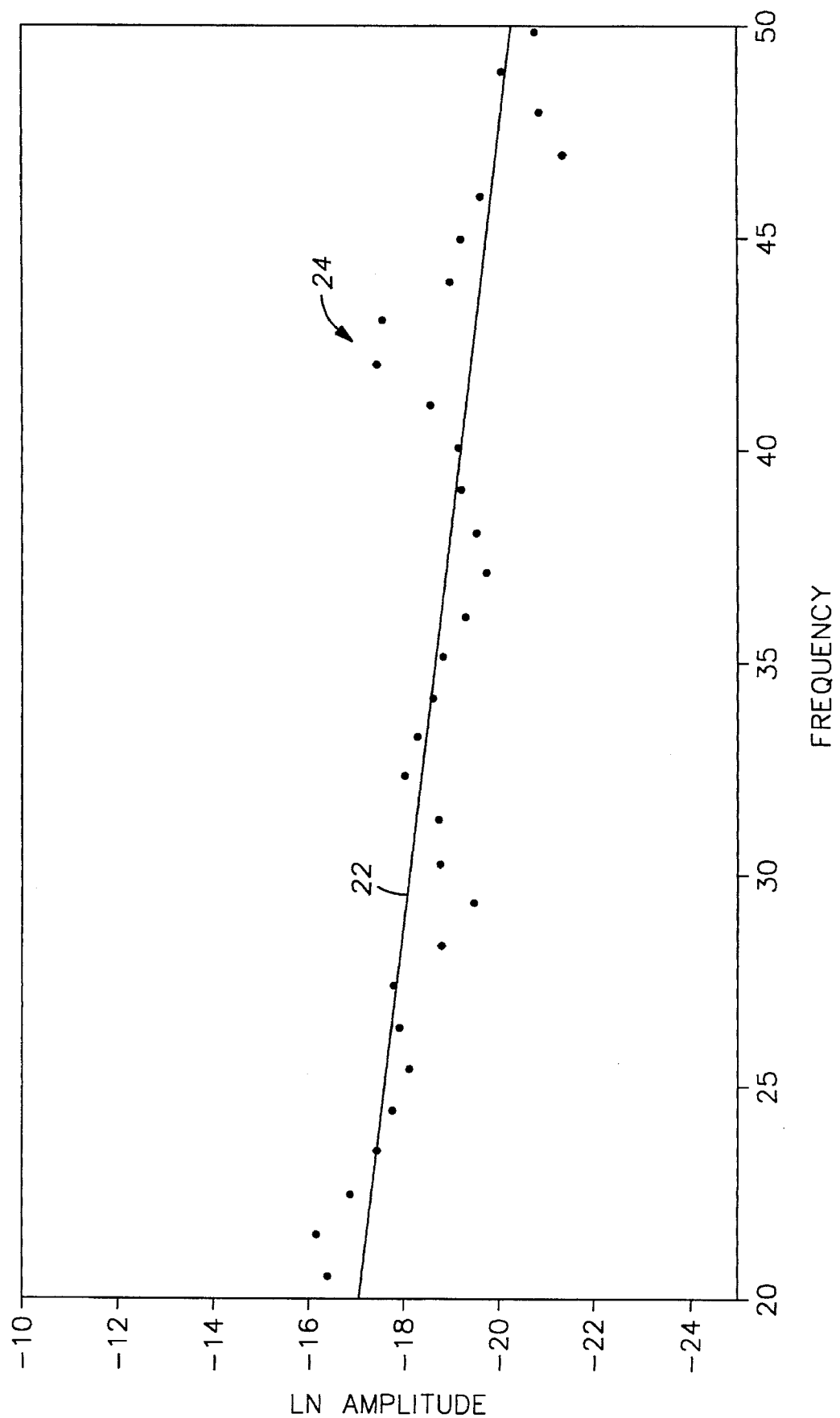
FIG. 4 is a graph of the logarithm of the reflection amplitude as a function of frequency for a low-Q region.

FIG. 4 is a graph of (ln A) vs. f for station 2200. The slope 22 of curve 24 in this region is 0.1034, characterizing an area of low Q from about station 2150 to the end of the line.

The quantity $\Delta T_{static}$ as above calculated is a constant time shift (linear phase correction) over the entire passband but it does not account for any non-linear phase correction to the data. Neither does the that quantity correct for frequency-dependent amplitude decay. It is required to provide a suitable compensating filter.

Attenuation causes amplitudes to decay according to equation (2). Hence, an amplitude filter that will correct the amplitude attenuation is given by $$A(f) = \exp(\pi f T/Q). \quad (10)$$

The amplitude filter as given by (10) can be applied in the frequency domain. Alternatively, (10) may be inverse Fourier-transformed and applied to the data in the time domain.

To find the phase filter, observe that the actual time shift at each frequency is given by (8). Denoting frequency by $f = f_{ref} - \Delta F$, (8) can be rewritten as $$\Delta T(f) = T/\pi Q \ln f_{ref}/f. \quad (11)$$

Note that $\Delta T(f)$ is the actual time shift for a given frequency f with respect to the reference frequency $f_{dref}$. However, we have already applied a constant time shift $\Delta T_{static}$ from (9) to the data. The phase shift filter $\phi(f)$ is the residual shift to be applied to the data after a constant $\Delta T_{static}$ has been applied to all frequencies, i.e., $$\phi(f) = \Delta T(f) - \Delta T_{static}. \quad (12)$$

Combining equations (9) and (11), we get $$\phi(f) = T/\pi Q \ln (f_{ref} f_{min}/f f_{max}). \quad (13)$$

Filter (13) may be applied in the frequency domain. Alternatively, (13) may be inverse Fourier transformed and applied in the time domain.

Preferably, $\Delta T$, A(f) and $\phi(f)$ are decomposed to surface-consistent quantities using a Gauss-Seidel iterative process as explained in US patent application Ser. No. 08/114,558, filed Aug. 30. 1993, now U.S. Pat. No. 5,479,376, in the name of Alfonso Gonzalez et al., entitled *Method for Compensating Seismic Wavefield Amplitudes for Transmission Losses in the Overburden*, an assigned to the assignee of this invention, and which is incorporated herein by reference.

In a preferred mode of operation, reflected seismic signals launched by a plurality of sources and detected by a plurality of receivers are discretized. The raw discretized signals are formatted as a set of time-scale traces. A time window of suitable length, such as 128 ms, is selected from that portion of the set of time scale traces that provides reliable reflection data signals. The amplitude spectrum for each trace of the set of time scale traces is derived. From that information, the rate of change of the natural logarithm of the trace amplitude as a function of frequency is measured to derive an estimate of the attenuation coefficient. Using the estimated attenuation coefficient, preferably in a surface-consistent sense as discussed earlier, a Q-derived static time correction, a phase-correction filter and an amplitude-correction filter are evaluated. The raw time-scale trace signals are corrected for dispersive-induced static time drift and are filtered in terms of phase and amplitude thereby to derive a new set of corrected seismic signals. The corrected seismic signals are subsequently processed in any desired manner such as by means of a commercial computer graphics program of any well-known type such as OASIIS Interpretation System as provided by Western Atlas Software Inc., to provide a physical model of subsurface earth layers.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A method for modeling a cross section of the earth from seismic data signals in the presence of anelastic regosol characteristics, comprising:

launching a seismic wavefield from an acoustic source from each one of a first plurality of spaced-apart source locations;

receiving said seismic wavefields at each one of a second plurality of spaced-apart seismic receivers after reflection from sub-surface earth layers, said receivers being offset from the respective source locations;

recording on a storage medium the reflected seismic wavefields, received by each of said second plurality of receivers, as a raw discrete time series of periodic electrical signals, each said discrete time series being formatted as one of a corresponding plurality of time-scale traces;

deriving the amplitude spectra for a selected time window of said time scale traces;

for a travel time T within said time window, estimating the rate of change, Q, of the natural logarithm of the amplitude of said periodic electrical signals as a function of frequency within an effective frequency passband included by said electrical signals;

for each said time scale trace, using the estimated value for Q and the ratio between a reference frequency, $f_{ref}$, and a selected frequency minimum, $f_{min}$, within the effective frequency passbands corresponding to the selected time windows for each said time scale trace, calculating a Q-derived static time-drift, $\Delta T_{static}$;

applying $\Delta T_{static}$ to each said time scale trace in a summing register to form new time scale traces corrected for dispersive-induced time drift; and using a computer-graphics program, displaying the new, corrected time scale traces to form a model of a cross section of the earth.

2. The method as defined by claim 1, wherein the Q-derived static time drift is calculated from $$\Delta T_{static} = (T/\pi Q) \ln (f_{ref}/f_{min}),$$

and decomposing $\Delta T_{static}$ into surface-consistent components.

3. The method as defined by claim 1, comprising:
applying a phase-correction filter and an amplitude-correction filter to the Q-derived static time-drift-corrected time-scale traces.

* * * * *